UNITED STATES PATENT OFFICE.

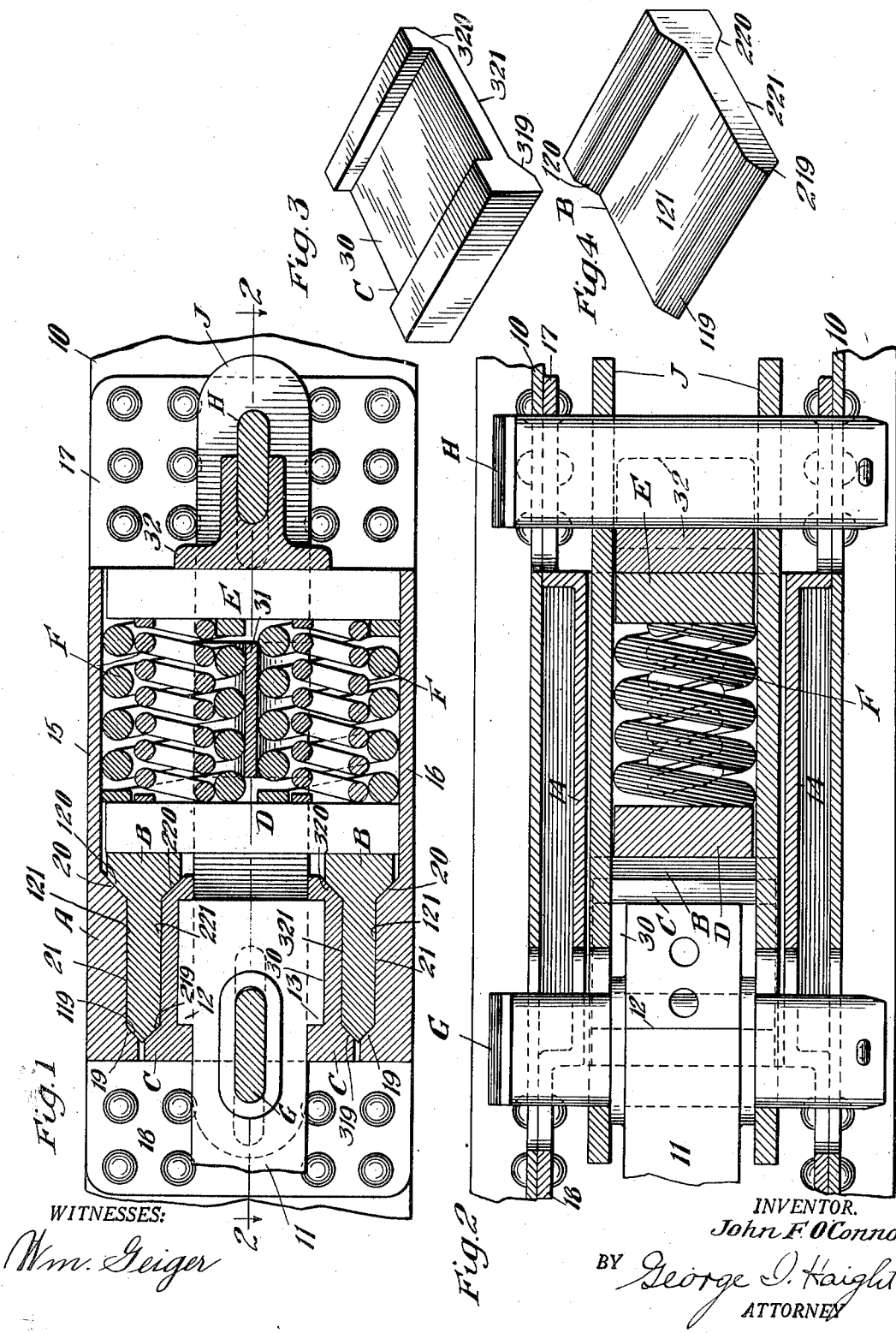

JOHN F. O'CONNOR, OF CHICAGO, ILLINOIS, ASSIGNOR TO WILLIAM H. MINER, OF CHAZY, NEW YORK.

HIGH-CAPACITY FRICTION SHOCK-ABSORBING MECHANISM.

1,303,377.  Specification of Letters Patent.  Patented May 13, 1919.

Application filed April 27, 1918. Serial No. 231,105.

*To all whom it may concern:*

Be it known that I, JOHN F. O'CONNOR, a citizen of the United States, residing at Chicago, in the county of Cook and State of Illinois, have invented a certain new and useful Improvement in High-Capacity Friction Shock-Absorbing Mechanism, of which the following is a full, clear, concise, and exact description, reference being had to the accompanying drawings, forming a part of this specification.

This invention relates to improvements in high capacity friction shock absorbing mechanism.

One object of the invention is to provide a friction shock absorbing mechanism, and one more particularly adapted for railway draft riggings, wherein friction shoes are employed that travel in unison with the actuating member such as the draw bar in a draft rigging.

Another and more specific object of the invention, is to provide a mechanism wherein is employed a relatively fixed friction shell, spring-actuated wedge elements, and friction shoes attached to and movable in unison with the pressure-transmitting or actuating element, such as the draw bar.

In the drawing forming part of this specification, Figure 1 is a vertical longitudinal, sectional view of a portion of a railway draft rigging showing my improvements in connection therewith. Fig. 2 is a horizontal, sectional view, taken substantially on the line 2—2 of Fig. 1. And Figs. 3 and 4 are detail, perspective views of one of the friction shoes and wedges, respectively, employed with my improvements.

In said drawing, 10—10 denote channel-shaped draft or center sills of a railway car and 11 a draw bar of standard type having a butt forming upper and lower shoulders 12 and 13 of the usual character.

In carrying out my invention, I employ a relatively fixed friction shell A, a pair of wedge members B—B, a pair of friction shoes C—C, a front follower D, a rear follower E, twin-arranged springs F—F, coupler key G, rear connecting key H and side links J—J.

The friction shell A is of substantially rectangular formation having side walls 14—14 offset for the greater portion of their length from the adjacent portions of the draft sills 10; and upper and lower horizontal, transversely extending walls 15 and 16. The shell A is provided with flange portions 17 and 18 at its rear and forward ends by which it is riveted to the draft sills, said flanges being suitably slotted to accommodate the longitudinal movements of the keys G and H. At its forward end, the shell A is provided on its top and bottom walls with front wedge faces 19—19, rear wedge faces 20—20 and intermediate longitudinally extending friction surfaces 21—21.

Each of the wedges B is provided with corresponding wedge faces 119 and 120 and a friction surface 121 coöperable, respectively, with the wedge surfaces 19 and 20 and the friction surface 21 of the shell A. Each wedge B is further provided on its inner side with corresponding opposed wedge faces 219 and 220 and a friction surface 221. Coöperable with the wedge faces and surfaces 219, 220 and 221 of each wedge B are corresponding wedge faces 319 and 320 and a friction surface 321 on the adjacent friction shoe C.

The friction shoes C are transversely grooved or channeled on their inner faces, as indicated at 30, so as to form front and rear shoulders and permit the friction shoes to be fitted over the upper and lower portions of the draw bar butt. In this manner, it is evident that the friction shoes C will move simultaneously and in unison with the draw bar under both buff and draft movements, a construction which I believe to be an entirely new departure from the prior art.

The rear or enlarged ends of the wedges B—B bear against the front follower D so that the twin springs F—F act directly on the said wedges. A combined spring spacer and limiting block 31 is interposed between the twin springs and the followers D and E.

The links J—J extend within the friction shell A, as clearly shown in Fig. 2, and I preferably employ a filler block 32 which is interposed between the rear key H and the rear follower E, said filler block being suitably slotted to fit over the key H.

The operation is as follows: Upon inward movement of the draw bar, the two friction shoes C will travel in unison with the draw bar and the coöperating sets of wedge faces 219, 319 and 220, 320 will tend to force the wedges B—B apart and thus augment the friction which will develop between the sets of friction surfaces 21 and 121, it being understood that the wedges B are resisted in their movement by the twin springs F. In draft, the friction shoes C will again move in unison with the draw bar and due to the action of the springs on the wedges B, the friction between the sets of friction surfaces 221 and 321 will be augmented as the wedges B will tend to be forced inwardly by the sets of wedging faces 19, 119 and 20, 120. In this manner, I obtain the frictional capacity of the gear under draft without placing any greater tension on the yoke-acting elements than is required to merely compress the springs of the gear, which I also believe to be entirely new. In buffing, it is of course evident that the yoke-acting members are not subject to any strains and the friction elements are directly actuated from the draw bar.

The mechanism shown can be comparatively cheaply manufactured since the shell, shoes and wedges can be made as castings; the parts may be readily assembled and disassembled; the arrangement is such as to be utilized with all standard shouldered draw bars with the desirable detachable draw bar and yoke connection; and a high frictional capacity is developed due to the ability to utilize twin springs co-acting with the friction elements and within the usual spacing permitted on railway cars.

Although I have herein shown and described what I now consider the preferred manner of carrying out the invention, the same is merely illustrative and I contemplate all changes and modifications that come within the scope of the claims appended hereto.

I claim:

1. In a friction shock absorbing mechanism, the combination with a friction shell and pressure-transmitting member relatively longitudinally movable; of wedge means co-acting with and movable relatively to said shell; spring means co-acting with said wedge means; friction elements movable in unison with said pressure-transmitting member and interposed between said member and the wedge means.

2. In a friction shock absorbing mechanism, the combination with a friction shell and a pressure-transmitting member relatively longitudinally movable; of two friction elements coöperable with said member and shell, said elements having co-acting wedge faces, both of said elements being movable substantially in unison upon relative movement between said member and shell in one direction and one of said elements remaining substantially stationary with respect to said shell while the other element moves in unison with said member upon relative movement of said member and shell in the opposite direction; and spring means co-acting with said friction elements.

3. In a friction shock absorbing mechanism, the combination with a friction shell and an actuating member relatively longitudinally movable; of a pair of friction elements coöperable with said member and shell, said shell and one of said elements having co-acting wedge faces, both of said elements being movable substantially in unison with said member upon relative movement between the shell and member in one direction, one of said elements remaining substantially stationary with respect to the shell upon relative movement of said member and shell in the opposite direction; and springs co-acting with said elements.

4. In a railway draft rigging, the combination with a friction shell and a draw bar; of a plurality of friction elements coöperable with said draw bar and shell, all of said elements being movable substantially in unison with the draw bar upon movement of the latter in one direction, a part only of said elements being movable in unison with the draw bar when the latter moves in the opposite direction; and spring means co-acting with said elements.

5. In a friction shock absorbing mechanism, the combination with a friction shell and actuating member relatively longitudinally movable; of duplicate sets of friction elements coöperable with said member and shell, each set comprising a plurality of elements, some of said elements being movable in unison with said member at all times, others of said elements being movable in unison with said member only upon movement of the latter in one direction relatively to the shell; and spring means co-acting with said elements.

6. In a railway draft rigging, the combination with a draw bar and yoke-acting means; of a friction shell; friction elements coöperable with said shell; spring means coöperable with said elements; and means for directly and frictionally resisting draft movement of said draw bar independently of the yoke-acting means.

7. In a railway draft rigging, the combination with a draw bar and yoke-acting means; of a friction shell; friction elements movable relatively to said shell, part of said elements being directly engaged with the draw bar and movable in unison with the latter under both buff and draft; and spring means co-acting with said elements.

8. In a friction shock absorbing mechanism, the combination with a relatively stationary friction shell and a movable actuating member; of a set of friction elements co-acting with said shell, said elements having coöperating engaging wedge faces, said set being movable substantially as an entity relatively to the shell upon movement of said member in one direction, one element of the set remaining substantially stationary with respect to the shell and the other movable in unison with said member upon movement of the latter in an opposite direction; and spring means coöperable with said friction elements.

9. In a friction shock absorbing mechanism, the combination with a friction shell having wedge faces on its interior; of wedge means co-acting with said wedge faces; friction shoe means co-acting with said wedge means, the friction shoe means and wedge means both moving relatively to the shell when the mechanism is operated from one end, said wedge means remaining stationary relatively to the shell when the mechanism is operated from the opposite end; means for actuating said friction shoe means relatively to the shell; and spring means co-acting with the wedge means to resist said relative movement.

10. In a railway draft rigging, the combination with a draw bar and yoke-acting means; of a friction shock absorber including a friction shell, friction elements and spring means, said draw bar being adapted to actuate the friction shock absorbing mechanism under buff without placing the yoke-acting means under strain; and means for actuating the friction mechanism under draft movement of the draw bar arranged to place the yoke-acting means only under tension for compressing the spring means.

11. In a railway draft rigging, the combination with a relatively fixed friction shell and a draw bar; of sets of friction elements interposed between said draw bar and shell, some of said elements being movable in unison with the draw bar under both buff and draft; spring means co-acting with said elements; and yoke-acting means associated with the draw bar.

12. In a friction shock absorbing mechanism, the combination with a friction shell having sets of wedge faces and friction surfaces on its interior; of wedges having corresponding wedge faces and friction surfaces coöperable with the friction shell; friction shoes, the shoes and wedges having coöperable wedge faces and friction surfaces; spring means co-acting with said wedges; and an actuating member for said friction shoes.

13. In a railway draft rigging, the combination with draft sills, a relatively fixed friction shell, and a draw bar; of a pair of wedges within the shell, said wedges and shell having coöperable wedge and friction surfaces; of a pair of friction shoes movable in unison with the draw bar under both buff and draft and interposed between the draw bar and said wedges, said shoes and wedges also having coöperable wedge faces and friction surfaces; spring means co-acting with the wedges; and yoke-acting means coöperable with the draw bar.

In witness that I claim the foregoing I have hereunto subscribed my name this 12 day of April, 1918.

JOHN F. O'CONNOR.